United States Patent

Singkornrat et al.

[11] Patent Number: 6,128,484
[45] Date of Patent: *Oct. 3, 2000

[54] WIRELESS TRANSCEIVERS FOR REMOTELY CONTROLLING A COMPUTER

[75] Inventors: Paripon Singkornrat, Boca Raton; Kenneth Louis Milsted, Boynton Beach; Kha Dinh Nguyen, Boca Raton, all of Fla.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/947,906

[22] Filed: Oct. 7, 1997

[51] Int. Cl.[7] .................................................. H04N 7/00
[52] U.S. Cl. .......................... 455/420; 455/6.3; 345/327
[58] Field of Search ....................... 455/420, 73; 370/313, 370/335; 395/284; 345/2, 327, 326, 1; 348/522; 340/825.24, 825.25; 709/208, 209, 223

[56] References Cited

U.S. PATENT DOCUMENTS

| | | | |
|---|---|---|---|
| 4,112,252 | 9/1978 | Liebler | 178/58 |
| 4,232,299 | 11/1980 | Eisenberg | 340/171 |
| 4,775,928 | 10/1988 | Kendall et al. | 395/750.02 |
| 5,045,948 | 9/1991 | Streck | 358/194.1 |
| 5,111,296 | 5/1992 | Duffield et al. | 348/565 |
| 5,204,768 | 4/1993 | Tsakiris et al. | 359/148 |
| 5,359,367 | 10/1994 | Stockill | 348/552 |
| 5,365,264 | 11/1994 | Inoue et al. | 348/70 |
| 5,396,546 | 3/1995 | Remillard | 379/96 |
| 5,428,388 | 6/1995 | Von Bauer et al. | 348/155 |
| 5,428,806 | 6/1995 | Pocrass | 395/284 |
| 5,539,478 | 7/1996 | Bertram | 348/734 |
| 5,563,630 | 10/1996 | Tsakiris | 345/160 |
| 5,574,964 | 11/1996 | Hamlin | 455/3.1 |
| 5,592,482 | 1/1997 | Abraham | 348/8 |
| 5,602,854 | 2/1997 | Luse et al. | 370/313 |
| 5,608,449 | 3/1997 | Swafford, Jr. et al. | 348/13 |
| 5,729,535 | 3/1998 | Rostoker et al. | 370/328 |
| 5,732,212 | 3/1998 | Perboltz et al. | 395/200.54 |
| 5,736,968 | 4/1998 | Tsakiris | 345/2 |
| 5,745,483 | 4/1998 | Nakagawa et al. | 370/335 |
| 5,787,259 | 7/1998 | Haroun et al. | 709/253 |
| 5,790,201 | 8/1998 | Antos | 348/552 |
| 5,805,806 | 9/1998 | McArthur | 395/200.8 |
| 5,844,893 | 12/1998 | Gollnick et al. | 370/329 |
| 5,880,721 | 3/1999 | Yen | 345/327 |
| 6,008,777 | 12/1999 | Yiu | 345/2 |

*Primary Examiner*—Nay Maung
*Assistant Examiner*—Sonny Trinh
*Attorney, Agent, or Firm*—Steven J. Meyers; Steven J. Soucar; Fleit, Kain, Gibbons, Gutman & Bongini P.L.

[57] ABSTRACT

A computer system includes a central processing unit (CPU) for providing computer output signals; a non-computational base transceiver coupled with the CPU. The base transceiver comprises an interface for communicating with the CPU; a modulator for receiving computer output signals and providing modulated signals representing said computer output signals; and a transmitter for receiving said modulated signals, and transmitting said modulated signals via wireless media; and a non-computational remote transceiver comprising: a receiver for receiving signals via wireless media; a transmitter for transmitting signals via wireless media.

12 Claims, 2 Drawing Sheets

WIRELESS TRANSCEIVERS FOR REMOTELY CONTROLLING A COMPUTER

BACKGROUND OF THE INVENTION

The present invention relates to computers and more specifically to a wireless remote control for a microcomputer. the personal computer has become very popular in both the home and in the workplace environment. The increasing use of the Internet will likely increase the demand for and the use of personal computers. One of the drawbacks of tower and desktop computers is that they lack portability. Accordingly, laptops have become popular but are generally more expensive than tower or desktop models. Thus, there exists a need for a portable device that provides a user remote control of a central (non-portable) computer.

SUMMARY OF THE INVENTION

Briefly, in accordance with one aspect of the invention in a computer system including a central processor unit (CPU) and a remote transceiver unit for controlling the CPU, a base transceiver comprises the following elements. A transmitter for transmitting signals, including CPU output signals, to the remote transceiver unit and a receiver for receiving signals, including user input signals, from the remote transceiver unit.

In accordance with another aspect of the invention, in a computer system including a central processor unit (CPU) and a base transceiver unit for controlling the CPU, a remote transceiver comprises a transmitter for transmitting signals, including user input signals, to the base transceiver unit; and a receiver for receiving signals, including computer output signals, from the base transceiver unit.

BRIEF DESCRIPTION OF THE DRAWING(S)

DESCRIPTION OF THE ILLUSTRATIVE EMBODIMENT(S)

Figure 1:
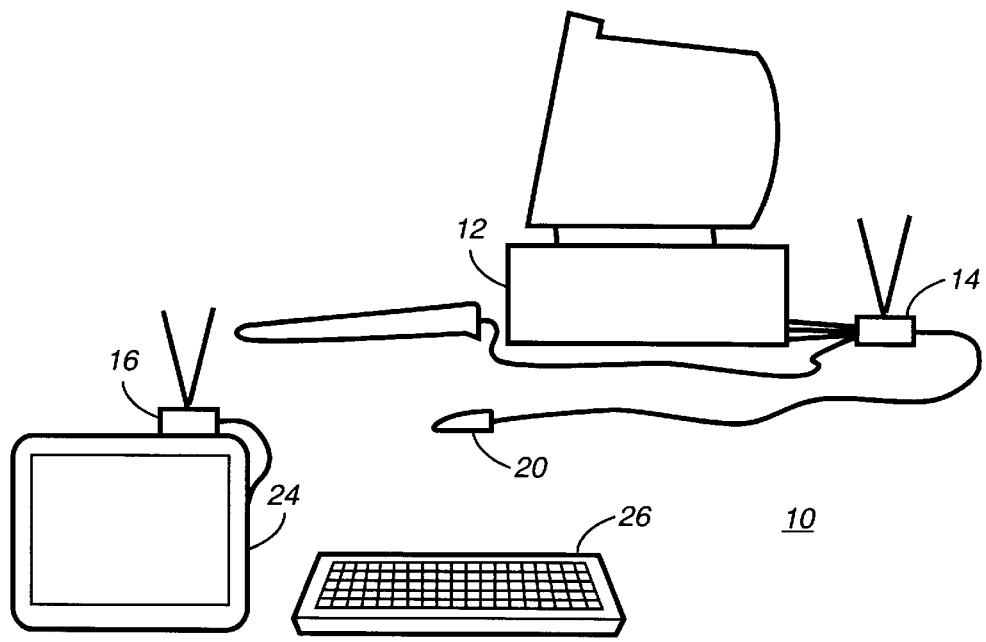
FIG. 1 is a block diagram of a computer system including a wire less remote control unit in accordance with the invention.

Referring to FIG. 1, there is shown a computer system 10 comprising a central processing unit (CPU) 12, a non-computational (or "dumb") base transceiver unit 14, and a remote transceiver unit 16. The base trasceive is non-computational in the sense that it is not primarily designed to process data or run applications programs. Instead, the base transceiver is designed to receive and transmit signals, thus performing certain coventional operations such as modulation, frequecy conversion, mixing, amplification, or noise removal and attenuation. Accordinly, the base transceiver does not include a central processing unit (e.g., a microprocessor) but may include a digital signal processor for "cleaning up" the received signals and other operations on the received and transmitted signals that do not involve processing of the madulating data itself. In accordance with the invention, the CPU 12 can be any data processing apparatus. In this embodiment the CPU 12 is an IBM personal computer (PC 12). The base transceiver 14 can be connected to the CPU 12 via the CPU's display, keyboard, or mouse ports or via any other input/output device of the PC 12. The base transceiver 14 has ports that connect to any of several common peripherals such a monitor 22, a keyboard 18, and a mouse 20 and provides a coupling for those peripherals into the PC 12. Alternatively, the base transceiver 14 could be physically integrated into the PC 12.

The base transceiver 14 receives I/O signals from the PC port(s) into which it is connected and converts those signals (in RGB form) into television NTSC signals and transmits them to the remote unit 16 via radio frequency, infra red, or other suitable wireless media. In this embodiment both the base and remote transceivers include antennae for providing an RF link between these units.

The remote transceiver 16 is connected to a television set 24 to provide a remote user a visual interface with the PC 12. Thus the user would be able to view what could be seen on the screen of the monitor 22. A keyboard 26 (preferably with a pointing device, such as a trackball) is connected to the remote transceiver 16 either by wire or wireless media (e.g., infra-red). The remote unit 14 receives the RF signals carrying information output by the PC 12, demodulates them, converting them to television NTSC format, and providing those signals to the connected television monitor.

Figure 2:
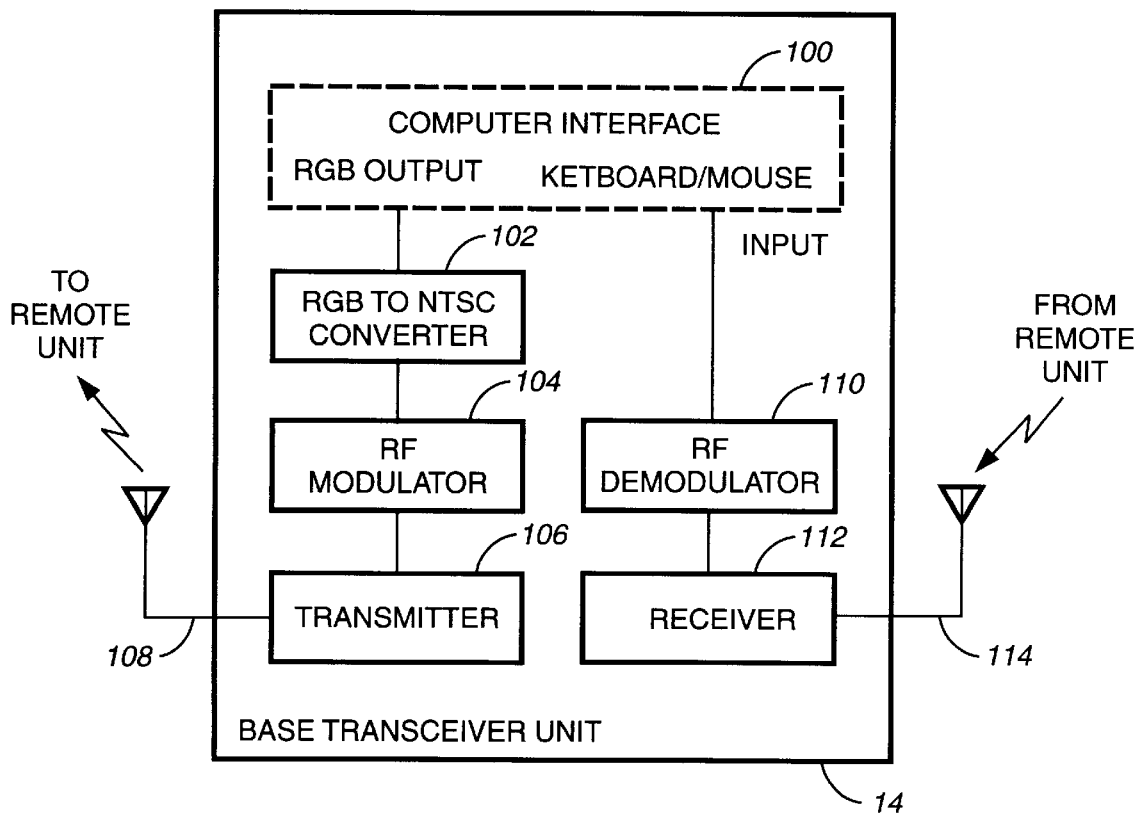
FIG. 2 is a block diagram of the base transceiver unit of FIG. 1.

Referring to FIG. 2 there is shown a block diagram of a base transceiver unit 14 in accordance with the invention. The base unit 14 communicates with the PC 12 via a computer interface 100. Thus, the base unit has a transmitter portion connected to the RGB (video) output of the PC 12. The base unit 14 receives PC video signals from the PC through an RGB to NTSC converter 102 which provides NTSC signals to an RF modulator 104. The modulator 104 modulates a carrier wave with the PC signals (in NTSC) form and provides the resulting signal to a transmitter section 106 for amplification and transmission to the remote unit 16 via an antenna 108. Alternatively, the base unit can include a modulator that modulates the carrier wave with RGB signals without using the RGB to NTSC converter 102. The remote receiver unit would then be adapted to demodulate the received signals to extract RGB signals and a monitor having an RGB input could be used. This will result in better resolution.

The base unit 14 also comprises a receiver section including an antenna 114 for receiving signals from the remote unit 16 which are amplified and processed (e.g., filtered, converted to an intermediate frequency, and amplified) by a receiver unit 112. An RF demodulator 110 receives the output of the receiver 112 and removes the intelligence (demodulated signals) and provides it to the keyboard/mouse input to control the PC 12. It should be understood that the base unit 14 could also use a single antenna (or aerial) with a transmit/receive switch.

Figure 3:
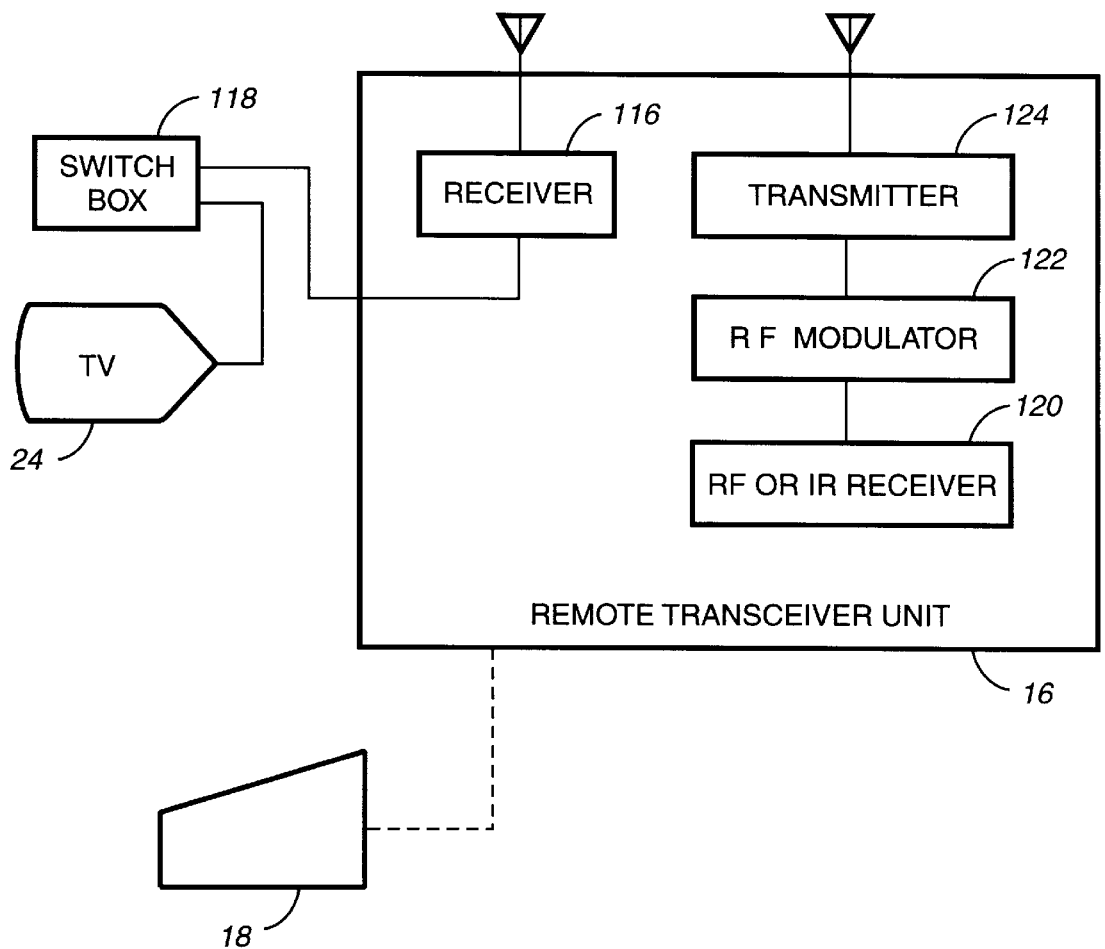
FIG. 3 is a block diagram of the remote transceiver unit of FIG. 1.

Referring to FIG. 3, there s shown a block diagram of a remote transceiver unit 16 in accordance with the invention. The remote unit comprises a receiver 116 for receiving RF signals from the base unit 14. The receiver provides the received signals to a television switch box 118, which in turn provides the signals to the television monitor 24. The remote user can further interact with the CPU via the keyboard 18 or other suitable input device. The keyboard 18 can be linked with the remote unit 16 by wire, infra-red (IR), or RF. The television monitor 24 may be any commercially available consumer television set. In this embodiment, the user does not have to undergo the expense of purchasing specialized equipment. However, another embodiment would comprise a portable or lap-top type unit that would include a screen such as those commonly used in lap-top personal computers (e.g., liquid crystal display or LCD) with supporting hardware, an integrated keyboard, and the functionality of the remote transceiver unit 16, to emulate the feel of a laptop at a fraction of the cost.

The remote transceiver unit 16 also comprises a transmitter section for transmitting user-generated control signals to the base unit 14. Thus the unit 16 further comprises an RF or IR unit 124 for receiving signals from the keyboard 18 or other input device. Unit 124 would not be necessary if an integrated keyboard or a wire connection to the keyboard 18 were used. An RF. modulator 122 modulates the signals received from the input device and provides those signals to a transmitter 120 for transmission via an antenna. As in the case of the base unit 14, one antenna can be used with a receive/transmit switch.

The remote control system of the invention provides a relatively inexpensive portable device such that a user can use a tower or desktop computer anywhere in a house or other facility. No data uploading or downloading is required because all data resides in the central unit. Multiple users can all use a single computer or single Internet connection by using several remote units.

What is claimed is:

1. A wireless remote for remote viewing and remote controlling a base computer system with a local keyboard input and a local display output, as if a user was sitting in front of the computer and operating the computer using the local input and local output, comprising:

a non-computational base transceiver coupled to the computer system comprising:

a base transmitter for transmitting video output signals from the computer system via a wireless media;

a base receiver for receiving user input signals via a wireless media; and a non-computational remote transceiver coupled to a display comprising:

a remote receiver for receiving video output signals from the base transmitter via a wireless media;

a display interface for displaying the video output signals from the remote receiver on a as if the base computer system is providing the video output signal via the local video output;

a keyboard interface for receiving user input from a keyboard and generating user input signals as if the user is providing the user input signals to the base computer system via the local keyboard input; and a remote transmitter for transmitting user input signals to the base transceiver via a wireless media.

2. The base transceiver unit of claim 1, further comprising an input port for connecting the base transceiver to a video output of a personal computer.

3. The base transceiver unit of claim 2, wherein the transmitter further comprises a modulator for modulating a carrier with computer output signals and an transmitter section for transmitting the modulated signals to the remote transceiver.

4. The base transceiver unit of claim 1, wherein the transmitter further comprises an output port for connecting the base transceiver to an input of the CPU.

5. The base transceiver of claim 4, further comprising a receiver for receiving signals from the remote unit, transmitted over a wireless medium.

6. The base transceiver unit of claim 5, further comprising a demodulator for demodulating the signals received from the remote unit.

7. The base transceiver unit of claim 6, wherein the demodulator is a radio-frequency modulator.

8. The remote transceiver of claim 1, further comprising a user input device for receiving information from a user.

9. The remote transceiver of claim 8, wherein the transmitter comprises a modulator for modulating the signals received from the user input device.

10. The remote transceiver of claim 1, further comprising a visual user interface for presenting information to a user.

11. The remote transceiver of claim 10, wherein the visual user interface comprises a screen.

12. The remote transceiver of claim 9, wherein the modulator is a radio frequency modulator.

* * * * *